US012277225B2

(12) United States Patent
Devries

(10) Patent No.: US 12,277,225 B2
(45) Date of Patent: Apr. 15, 2025

(54) DETERMINING AUTHENTICITY OF BINARY IMAGES

(71) Applicant: Wind River Systems, Inc., Alameda, CA (US)

(72) Inventor: David Alexander Devries, Ottawa (CA)

(73) Assignee: Wind River Systems, Inc., Alameda, CA (US)

( * ) Notice: Subject to any disclaimer, the term of this patent is extended or adjusted under 35 U.S.C. 154(b) by 411 days.

(21) Appl. No.: 16/740,635

(22) Filed: Jan. 13, 2020

(65) Prior Publication Data

US 2021/0216636 A1 Jul. 15, 2021

(51) Int. Cl.
  *G06F 21/57* (2013.01)
  *G06F 8/65* (2018.01)
  *G06F 21/51* (2013.01)
  *H04L 9/32* (2006.01)

(52) U.S. Cl.
  CPC ............ *G06F 21/57* (2013.01); *G06F 8/65* (2013.01); *G06F 21/51* (2013.01); *H04L 9/3234* (2013.01); *H04L 9/3247* (2013.01); *H04L 9/3263* (2013.01)

(58) Field of Classification Search
  None
  See application file for complete search history.

(56) References Cited

U.S. PATENT DOCUMENTS

| | | | | |
|---|---|---|---|---|
| 7,191,464 B2 * | 3/2007 | Cromer | ................ | G06F 21/575 713/1 |
| 9,876,788 B1 * | 1/2018 | Ziraknejad | .............. | G06F 21/34 |
| 10,049,202 B1 * | 8/2018 | Johansson | .............. | G06F 3/0486 |
| 10,050,787 B1 * | 8/2018 | Johansson | .............. | H04L 9/0866 |
| 10,637,853 B2 * | 4/2020 | Lindemann | ........... | H04L 63/061 |
| 11,210,679 B2 * | 12/2021 | Camenisch | ........ | G06Q 30/0185 |
| 11,294,188 B1 * | 4/2022 | Birklbauer | ........... | H04N 13/344 |
| 11,558,365 B1 * | 1/2023 | McCorkendale | ..... | H04L 63/083 |
| 2002/0122568 A1 * | 9/2002 | Zhao | ................ | H04N 21/8358 382/100 |
| 2010/0275026 A1 * | 10/2010 | Mclean | ................ | G06F 21/12 713/176 |
| 2014/0282978 A1 * | 9/2014 | Lerner | ................ | H04L 63/083 726/7 |
| 2019/0183430 A1 * | 6/2019 | Alphonse | .............. | A61B 5/1118 |
| 2020/0034739 A1 * | 1/2020 | Chung | ................ | G16H 50/30 |
| 2020/0043236 A1 * | 2/2020 | Miller | ................ | H04N 13/398 |
| 2020/0322132 A1 * | 10/2020 | Covaci | ................ | H04L 9/0637 |

FOREIGN PATENT DOCUMENTS

CN 1088416209 A * 3/2018 ............ G06F 21/51

* cited by examiner

*Primary Examiner* — Daniel B Potratz
*Assistant Examiner* — Mayasa A. Shaawat
(74) *Attorney, Agent, or Firm* — Fay Kaplun & Marcin, LLP

(57) ABSTRACT

A method is described that includes receiving source code corresponding to a program to be loaded on a processing device, generating a representation of the source code, generating a first authentication indication that indicates the representation is authentic and is based on the source code, generating a second authentication indication that indicates a build server generating the representation is authentic, the second authentication indication generated using an attestation operation and generating a modified representation including the representation, the first authentication indication, and the second authentication indication.

13 Claims, 2 Drawing Sheets

DETERMINING AUTHENTICITY OF BINARY IMAGES

BACKGROUND INFORMATION

Source code may represent the fundamental component of a program, an application, etc. The source code may be compiled to generate object code that may be used to execute the program on a processor. A build server may create a binary image representative of the source code. A destination component that receives and/or uses the corresponding program may compare the binary image to the received program to determine whether a clean version of the program as intended by the supplier of the source code has been received. For example, the binary image may be signed, and the resulting signature may be used to verify the authenticity of the source code of the program. However, the build server may be attacked to compromise the binary image creation process where malware or other malicious software is inserted in the generated binary image (e.g., the unsigned binary image). A signing server that signs the binary image performs this operation based on an assumption that the binary image is based only on the source code. Thus, when the build server is infiltrated, the signing server may sign any binary image from the build server that may include the malware, resulting in the destination component determining that the improper binary image is authentic.

SUMMARY

In some exemplary embodiments a method is described for authenticating a software program. The method includes receiving source code corresponding to a program to be loaded on a processing device, generating a representation of the source code, generating a first authentication indication that indicates the representation is authentic and is based on the source code, generating a second authentication indication that indicates a build server generating the representation is authentic, the second authentication indication generated using an attestation operation and generating a modified representation including the representation, the first authentication indication, and the second authentication indication.

In further exemplary embodiments, a system having a build server, a signing server and an attester is described. The build server receives source code corresponding to a program to be loaded on a processing device, the build server configured to generate a representation of the source code. The signing server generates a first authentication indication that indicates the representation is authentic and is based on the source code. The attester generates a second authentication indication that indicates the build server is authentic, the second authentication indication generated using an attestation operation. The signing server is further configured to generate a modified representation including the representation, the first authentication indication, and the second authentication indication.

In still further exemplary embodiments, a method for authenticating a software program is described. The method includes receiving source code corresponding to a program to be loaded on a processing device, generating an unsigned binary image of the source code, generating a binary signature indicating the unsigned binary image is authentic and is based on the source code, generating an attestation signature indicating a build server generating the unsigned binary image is authentic, the attestation signature generated using an attestation operation, signing the unsigned binary image with the binary signature and the attestation signature using a vendor key and an administrator key, respectively and generating a signed binary image including the binary signature and the attestation signature.

DETAILED DESCRIPTION

Figure 1:
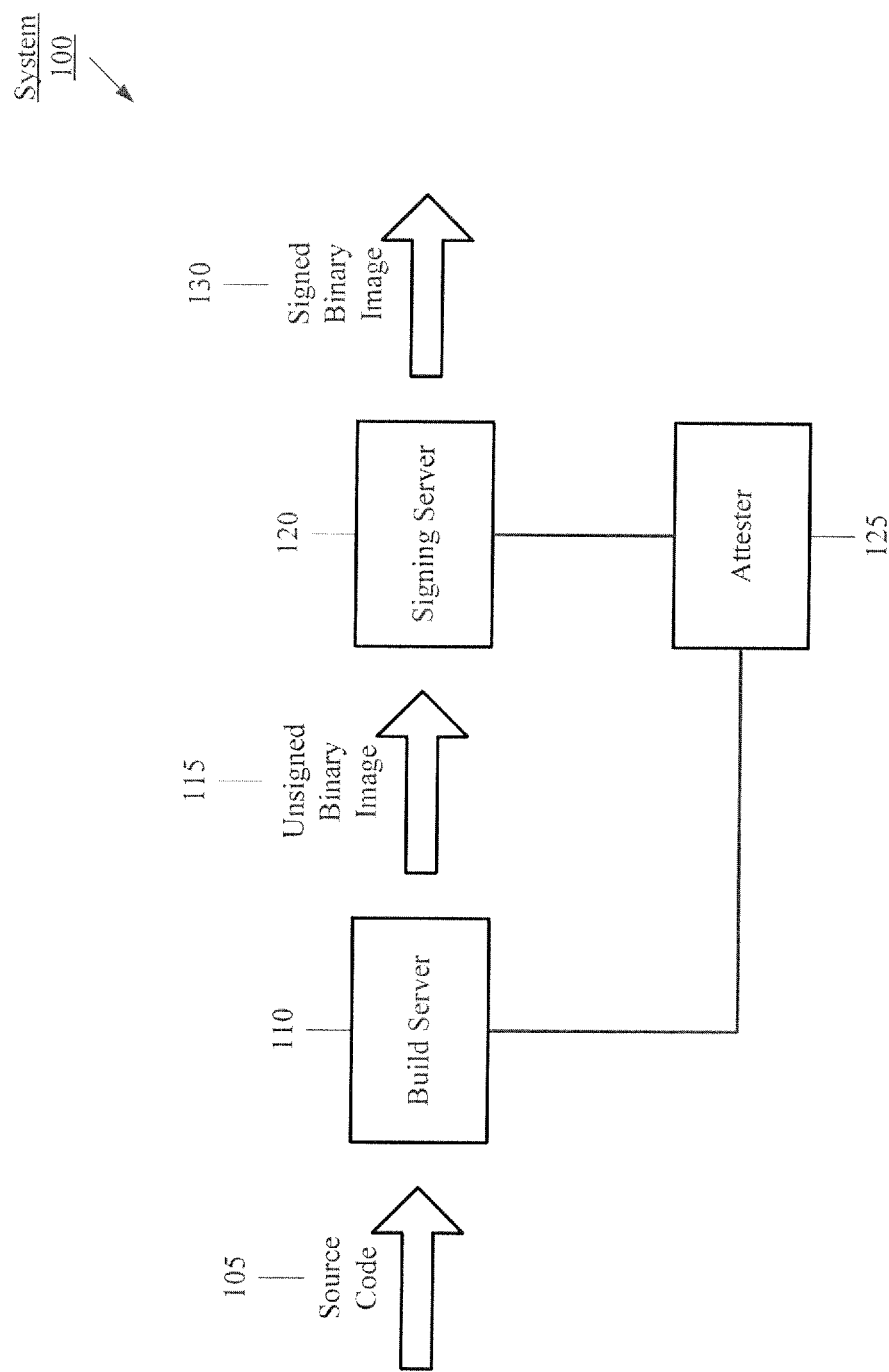
FIG. 1 shows an exemplary system used to determine an authenticity of a binary image according to the exemplary embodiments.

The exemplary embodiments may be further understood with reference to the following description and the related appended drawings, wherein like elements are provided with the same reference numerals. The exemplary embodiments are related to a device, a system, and a method for authenticating a binary image and a build server that generates the binary image. The exemplary embodiments may include a further authentication for the build server to ensure that the binary image was created without alteration and based only on intended source material. The exemplary embodiments may utilize a first authentication indication for the binary image and a second authentication indication for the build server.

The exemplary embodiments are described with regard to generating a binary image of source code and verifying an authenticity of the binary image as well as the build server that generates the binary image. However, the particular components and inputs/outputs described with respect to the exemplary embodiments are only illustrative and variations to the components, inputs, and/or outputs may be used within the scope of the exemplary embodiments. For example, the binary image may represent any representation used for another object. In another example, the source code may be any source material that is to be authenticated. In a further example, the exemplary embodiments relate to a build environment for a program but may also be applied to other environments in which source material and a component processing the source material are authenticated.

A build server may be used to compile and assemble a binary image of source code corresponding to a computing program. After compiling the source code to generate the binary image, a signing service may append an authentication mark (e.g., a signature) that is indicative of a claim of the authenticity of the binary image. The binary image may then be used with subsequent secure processes to ensure that a device using the program only loads trusted binary images. For example, the secure process may be a secure boot sequence involving a hardware driven authentication mechanism to cryptographically verify the binary image prior to allowing a boot process to proceed. The binary image may also be used for manual verification of authenticity.

With the build server being the first component to receive the source code and generate the binary image, a malicious source may compromise the build server so that malware and/or other malicious software is inserted in any binary image generated by the build server. If a build system (e.g., the build serer) is hacked to include malware in the binary image, the signing server may still properly sign the binary image including the malware, thereby indicating that the improper binary image is authentic to subsequent processing components (e.g., a destination component performing a secure boot). For example, a list of known-valid source code configurations may indicate whether the binary image is authentic. The malware may include in the list an item that corresponds to the improper binary image.

The exemplary embodiments provide a mechanism to add evidence to the binary image to verify whether the binary image was built by an authentic build server in a trusted configuration (e.g., without malware). The mechanism according to the exemplary embodiments may utilize a first authentication indication directed to the binary image and a second authentication indication directed to the build server that generated the binary image. As will be described below, the first and second authentication indications may be signatures that may be used by a subsequent processing component to verify the authenticity of the binary image (e.g., for manual verification, for secure booting purposes, etc.).

FIG. 1 shows an exemplary system 100 used to determine an authenticity of a binary image according to the exemplary embodiments. The system 100 may represent a build environment in which binary images are generated with indications of authenticity. The indications of authenticity may include a binary signature that verifies the authenticity of the binary image and an attestation signature that verifies the authenticity of a device that generates the binary image (e.g., against a first list of known-valid source code configurations for the binary image and against a second list of known-valid build system configurations for the attestation signature). The binary image may be used by a processing component to verify that a program being executed is clean without malicious or inadvertent coding. For example, the processing component may be included in any electronic device (e.g., a mobile phone, a tablet computer, a smartphone, a phablet, an embedded device, a wearable device, a Cat-M device, a Cat-M1 device, an MTC device, an eMTC device, another type of Internet of Things (IoT) device, a set top box, a smart television, a desktop computer, a desktop computer, etc.). The system 100 may include a build server 110, a signing server 120, and an attester 125.

The exemplary embodiments are described with regard to a system 100 including servers as separate components that individually perform respective operations with inputs and outputs being exchanged between one another (e.g., via direct communication pathways, via a wired and/or wireless network, etc.). However, this configuration of separate servers having a communication functionality is only exemplary. According to another implementation, the system 100 may be represented in a single processing device. The servers of the system 100 may therefore represent the operations that are performed within the device. The servers may also represent modular components that provide further functionalities when incorporated with a main processing device (e.g., the build server 110 may be implemented as the main processing device with the signing server 120 and the attester 125 being modular components that interact with the build server 110). In a further implementation, the system 100 may be represented in a cloud or with virtual machines. When implemented in a cloud or with virtual machines, the functionalities described for the servers 110, 120, 125 of the system 100 may be instructions that may cause other components or other devices to perform corresponding operations.

The source code 105 may be a fundamental component from which a computer program is created. For example, the source code 105 may be computer code (e.g., using any programming language, script language, etc.) that is compiled (e.g., to generate object code) to create an executable program.

The build server 110 may be configured to receive source code 105 from a repository, compile the source code 105, and generate an unsigned binary image 115 based on the source code 105. The build server 110 may represent any processing component that may be centralized and reliable for use in a development project. The build server 110 may use a clean slate approach with no unapproved configurations or artifacts present in performing its operations. The build server 110 operates with the source code 105 being pulled from the repository and based on an assumption that the source code 105 is committed code to be included in a release version of the program. In performing the operations, the build server 110 may mimic an environment of the destination processing component to emphasize areas where a developer's local configurations may make the source code 105 to behave in an inadvertent or different manner.

The unsigned binary image 115 may be a digital image of the source code 105 where each pixel has one of two possible values. The unsigned binary image 115 may be bi- or two-level where each pixel is stored as a single bit (e.g., 0 or 1).

The signing server 120 may be configured to receive the unsigned binary image 115 and utilize a vendor key to sign the unsigned binary image 115 with a binary signature. The binary signature may represent a state of the source code 105 on which the build server 110 generated the unsigned binary image 115. The binary signature may be used by a destination processing component to verify an authenticity of the binary image (e.g., during a secure boot sequence). Based on the assumption that the unsigned binary image 115 is generated by the build server 110 in an intended manner (e.g., no malware), the binary signature may utilize any signature mechanism to sign the binary image with the binary signature based on a vendor key that may be associated with a vendor who developed the program based on the source code 105. For example, the signature mechanism may be based on a digital signature certificate, a private key and public key pair, etc. The signature mechanism may also utilize any cryptographic function (e.g., a Secure Hash Algorithm 2 (SHA-2) family such as 256 bits (SHA-256) or 512 bits (SHA-512)). The destination processing component may utilize a list of known-valid source code configurations to compare the binary signature of the binary image to verify authenticity. The list may be provided by the vendor that developed the source code 105 and the program based on the source code 105.

The attester 125 may be configured to create an attestation signature so that the binary image may be signed based on the attestation signature using a vendor key. The vendor key used by the signing server 120 to sign the unsigned binary image 115 with the attestation signature may be the same or be a different vendor key used by the signing server 120 to sign the unsigned binary image 115 with the binary signature. The attestation signature may indicate a state of the build server 110 and any associated application (e.g., executed by the build server 110 or other device contributing to the generation of the unsigned binary image 115) while generating the unsigned binary image 115. The destination processing component may utilize a list of known-valid build system configurations to compare the attestation signature of the binary image to verify authenticity. The list may be provided by an administrator or entity managing the build server 110.

The exemplary embodiments utilize attestation as a further authentication feature to verify the authenticity of a binary image. Attestation may refer to a process (e.g., a cryptographic process) that verifies that a system (e.g., the build server 110) is correct and has not been compromised (e.g., by malware). Accordingly, various factors (e.g., the hardware configuration of the build server 110, binaries of an operating system of the build server 110, applications including compilers of the build server 110, allocated and/or unallocated regions of a memory of the build server 110, etc.) may be hashed or measured to generate the attestation signature. The attester 125 may be configured as a trusted, separate entity in which the operations of the attester 125 are performed in a separate, smaller, and more protected environment to minimize or eliminate any malicious attack. In an exemplary implementation, the system 100 may be run as a guest operating system in a virtualized environment. The attester 125 may be configured as a separate, privileged operating system that performs the measurement and signing. When the unsigned binary image 115 is being built from the source code 105, the attester 125 may calculate the hash of the build server 110 and sign the unsigned binary image with the attestation signature. The attester 125 may perform its operations at any time relative to when the unsigned binary image 115 is generated (e.g., before, during, or after the build server 110 has generated the unsigned binary image 115). The attester 125 may subsequently pass the attestation signature to the signing server 120.

Upon receipt of the attestation signature from the attester 125, the signing server 120 may generate the signed binary image 130 by further appending and signing the attestation signature to the image using a corresponding vendor key. The signing server 120 may output a signed binary image 130 that includes the binary image as output by the build server 110, the binary signature as signed by the signing server 120 using a first vendor key, and the attestation signature as signed by the signing server 120 using a second vendor key.

After deployment of the signed binary image 130, the destination processing component or a manual verification process may verify the authenticity of the source code 105 and the build server 110 by verifying the binary signature and the attestation signature, respectively, against a list of known-valid source code and build system configurations, respectively. In an exemplary implementation, this authentication verification process performed by the destination processing component may be integrated into a secure boot sequence.

Using the exemplary embodiments, the destination processing component may further increase a probability that a determination regarding the authenticity of a binary image is correct. In verifying the authenticity of the binary image as generated by the build server 110 while further verifying the authenticity of the build server 110 that generated the binary image, the destination processing component may proceed with a secure boot sequence with the knowledge that the boot process may be performed so that the destination processing component loads in a trusted state.

Figure 2:
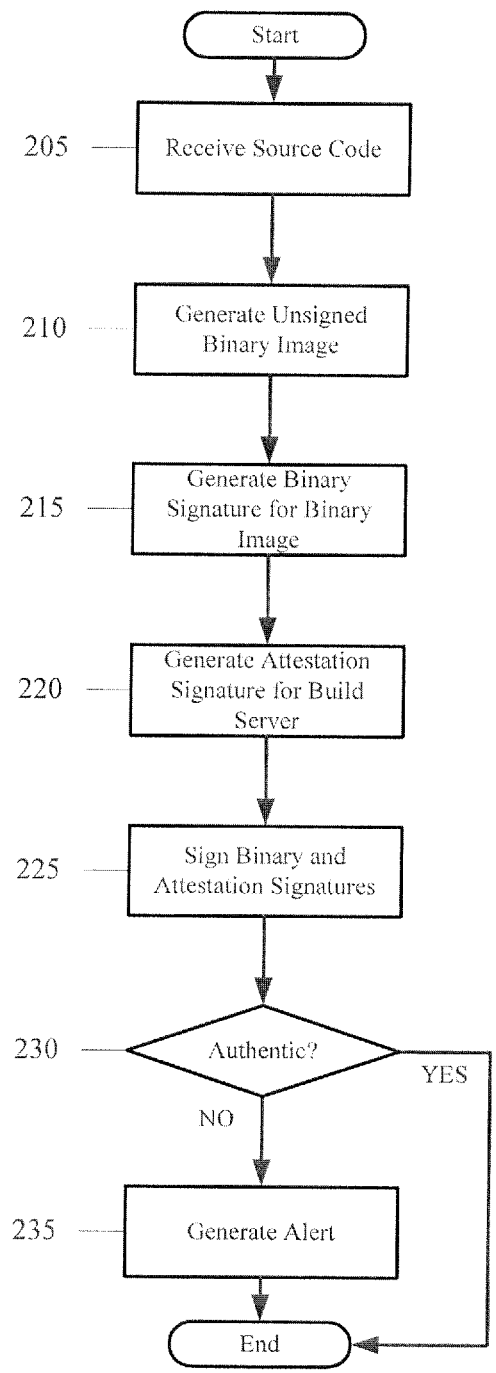
FIG. 2 shows an exemplary method for determining an authenticity of a binary image according to the exemplary embodiments.

FIG. 2 shows an exemplary method for determining an authenticity of a binary image according to the exemplary embodiments. The method 200 may relate to the operations performed by the system 100 in generating the signed binary image 130 including both a binary signature that verifies an authenticity of the unsigned binary image 115 as generated by the build server 110 and an attestation signature that verifies an authenticity of the build server 110 at a time that the unsigned binary image 115 is generated. The method 200 will be described with regard to the system 100 of FIG. 1.

In 205, the build server 110 receives the source code 105 from a repository. The repository may include a plurality of different build codes corresponding to respective programs. For a given program, the build server 110 may request and/or retrieve the source code 105 corresponding to the program for which the binary image is to be generated. In 210, the build server 110 generates the unsigned binary image 115. For example, the build server 110 may compile the source code 105 and generate the unsigned binary image 115 where each pixel of the unsigned binary image 115 is represented with one of two possible values.

In 215, the signing server 120 receives as an input the unsigned binary image 115 from the build server 110. The signing server 120 may generate a binary signature for the unsigned binary image 115 indicative of a state of the unsigned binary image 115. As a further authentication verification, in 220, the attester 125 may generate an attestation signature for the build server 110 indicate of a state of the build server 110 and any accompanying applications used in generating the unsigned binary image 115. The binary signature and the attestation signature may be generated using any signature mechanism.

In 225, the signing server 120 signs the unsigned binary image using a first vendor key based on the binary signature and a second vendor key based on the attestation signature. The first and second vendor keys may be the same or different. In an exemplary implementation, the first and second vendor keys may be a private key used by the developer of the source code and an administrator of the build server 110, respectively.

In 230, a destination processing component may receive the signed binary image 130 that is used as a basis to perform a trusted operation (e.g., a secure boot sequence). The destination processing component may use the signed binary image 130 to verify an authentication of whether the program is loaded in an intended manner (e.g., without malware). For example, the destination processing component may use the binary signature included in the signed binary image 130 to verify the authentication of the program being loaded against a list of known-valid source code configurations and verify the authentication of the program being loaded against a list of known-valid build system configurations. If the program is loaded properly based on the verified authentication, the destination processing component may continue with the trusted operation (e.g., a boot phase). If the program is loaded improperly based on a failed authentication, the destination processing component continues to 235 where an alert is generated. Alternatively, or in addition, the destination processing component may attempt to address the failed authentication, terminate loading the program, etc.

The exemplary embodiments provide a device, system, and method for verifying whether a binary image was built on an uncompromised build server. With possible attacks on a build server that generates a binary image, the mechanism according to the exemplary embodiments provide an addition verification process by generating a first authentication indication corresponding to an authenticity of the binary image and a second authentication indication corresponding to an authenticity of the build server at a time that the binary image is generated. The second authentication indication may be performed using an attestation process at a secured and trusted environment.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Mac platform and MAC OS, a mobile device having an operating system such as iOS, Android, etc. In a further example, the exemplary embodiments of the above described method may be embodied as a program containing lines of code stored on a non-transitory computer readable storage medium that may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method, comprising:
    receiving source code corresponding to a program to be loaded on a processing device;
    generating a representation of the source code;
    generating a first authentication indication that indicates the representation is authentic and is based on the source code;
    generating a second authentication indication that indicates a build server generating the representation is authentic and is generated based on an intended source code without a presence of malware, the second authentication indication generated using an attestation operation, wherein the first authentication indication is a binary signature and wherein the second authentication indication is an attestation signature, wherein the representation is signed with the binary signature and the attestation signature using at least one key;
    providing at least one further key corresponding to the at least one key to decipher the binary signature and the attestation signature;
    comparing the binary signature and the attestation signature to at least one verified binary signature and at least one verified attestation signature, respectively; and
    generating a modified representation including the representation, the first authentication indication, and the second authentication indication.

2. The method of claim 1, wherein the representation is a binary image.

3. The method of claim 1, wherein the modified representation is used in a trusted load sequence to verify that the program is loaded in a trusted state based on the first and second authentication indications.

4. The method of claim 1, wherein the generating the second authentication indication is performed in a separate, protected environment relative to the build server.

5. The method of claim 1, wherein the attestation operation is based on at least one of (i) a hardware configuration of the build server, (ii) binaries of an operating system of the build server, (iii) one or more applications of the build server, (iv) allocated regions of a memory of the build server, or (v) unallocated regions of the memory of the build server.

6. A system, comprising:
    a build server comprising memory configured to receive source code corresponding to a program to be loaded on a processing device, the build server configured to generate a representation of the source code;
    a signing server configured to generate a first authentication indication that indicates the representation is authentic and is based on the source code; and
    an attester configured to generate a second authentication indication that indicates the build server is authentic and is generated based on an intended source code without a presence of malware, the second authentication indication generated using an attestation operation, wherein the first authentication indication is a binary signature and wherein the second authentication indication is an attestation signature, wherein the representation is signed with the binary signature and the attestation signature using at least one key,
    wherein the signing server is further configured to sign the representation with the binary signature and the attestation signature using at least one key; and
    a destination processing component configured to receive at least one further key corresponding to the at least one key to decipher the binary signature and the attestation signature, the destination processing component configured to compare the binary signature and the attestation signature to at least one verified binary signature and at least one verified attestation signature, respectively,
    wherein the signing server is further configured to generate a modified representation including the representation, the first authentication indication, and the second authentication indication.

7. The system of claim 6, wherein the representation is a binary image.

8. The system of claim 6, wherein the modified representation is used in a trusted load sequence to verify that the program is loaded in a trusted state based on the first and second authentication indications.

9. The system of claim 6, wherein the attester is in a separate, protected environment relative to the build server.

10. A method, comprising:
    receiving source code corresponding to a program to be loaded on a processing device;
    generating an unsigned binary image of the source code;
    generating a binary signature indicating the unsigned binary image is authentic and is based on the source code;
    generating an attestation signature indicating a build server generating the unsigned binary image is authentic and is generated based on an intended source code without a presence of malware, the attestation signature generated using an attestation operation, wherein the first authentication indication is a binary signature and wherein the second authentication indication is an attestation signature, wherein the representation is signed with the binary signature and the attestation signature using at least one key;
    signing the unsigned binary image with the binary signature and the attestation signature using a vendor key and an administrator key, respectively; and
    providing a public vendor key to decipher the binary signature;
    providing a public attestation key to decipher the attestation signature; and
    comparing the binary signature and the attestation signature to at least one verified binary signature and at least one verified attestation signature, respectively; and
    generating a signed binary image including the binary signature and the attestation signature.

11. The method of claim 10, wherein the signed binary image is used in a trusted load sequence to verify that the program is loaded in a trusted state based on the binary signature and the attestation signature.

12. The method of claim 11, wherein the trusted load sequence is a secure boot sequence.

13. The method of claim 10, wherein the generating the attestation signature is performed in a separate, protected environment relative to the build server.

\* \* \* \* \*